(12) United States Patent
Golan et al.

(10) Patent No.: US 8,437,059 B2
(45) Date of Patent: May 7, 2013

(54) METHOD FOR RECONSTRUCTING A HOLOGRAPHIC PROJECTION

(75) Inventors: Lior Golan, Haifa (IL); Shy Shoham, Haifa (IL)

(73) Assignee: Technion Research & Development Foundation Limited, Haifa (IL)

(*) Notice: Subject to any disclaimer, the term of this patent is extended or adjusted under 35 U.S.C. 154(b) by 537 days.

(21) Appl. No.: 12/691,083

(22) Filed: Jan. 21, 2010

(65) Prior Publication Data
US 2011/0176190 A1 Jul. 21, 2011

(51) Int. Cl.
*G03H 1/08* (2006.01)
(52) U.S. Cl.
USPC .................................... 359/9; 359/32
(58) Field of Classification Search .................. None
See application file for complete search history.

(56) References Cited

U.S. PATENT DOCUMENTS

| | | |
|---|---|---|
| 3,588,217 A | 6/1971 | Mathisen |
| 3,640,599 A | 2/1972 | Van Ligten |
| 3,650,595 A | 3/1972 | Gerritsen et al. |
| 3,658,403 A | 4/1972 | Greenaway et al. |
| 5,337,170 A | 8/1994 | Khoury et al. |
| 6,016,210 A | 1/2000 | Stappaerts |
| 6,018,413 A | 1/2000 | Oka |
| 7,715,084 B2 | 5/2010 | Tan et al. |
| 2002/0043561 A1 | 4/2002 | Wirth et al. |
| 2002/0145042 A1 | 10/2002 | Wirth et al. |
| 2002/0153422 A1 | 10/2002 | Zhu et al. |
| 2003/0019931 A1 | 1/2003 | Tsikos et al. |
| 2003/0019932 A1 | 1/2003 | Tsikos et al. |
| 2003/0024987 A1 | 2/2003 | Zhu |
| 2003/0035460 A1 | 2/2003 | Tsikos et al. |
| 2003/0035461 A1 | 2/2003 | Tsikos et al. |
| 2003/0042309 A1 | 3/2003 | Tsikos et al. |
| 2003/0042314 A1 | 3/2003 | Tsikos et al. |
| 2003/0071123 A1 | 4/2003 | Tsikos et al. |
| 2003/0071124 A1 | 4/2003 | Tsikos et al. |
| 2003/0085280 A1 | 5/2003 | Tsikos et al. |
| 2003/0098349 A1 | 5/2003 | Tsikos et al. |
| 2007/0175999 A1 | 8/2007 | Tsikos et al. |
| 2008/0002211 A1 | 1/2008 | Park et al. |
| 2008/0212034 A1 | 9/2008 | Aksyuk et al. |
| 2008/0247016 A1* | 10/2008 | Facius .............................. 359/15 |
| 2009/0141753 A1 | 6/2009 | Furuya et al. |
| 2009/0257106 A1 | 10/2009 | Tan et al. |
| 2010/0097672 A1 | 4/2010 | Leister |
| 2010/0141898 A1 | 6/2010 | Moussa |

FOREIGN PATENT DOCUMENTS

| | | |
|---|---|---|
| WO | WO 2009040570 A1 * | 4/2009 |
| WO | WO 2009/087358 | 7/2009 |

OTHER PUBLICATIONS

L. Golan, S. Shoham, 'Speckle elimination using shift-averaging in high-rate holographic projection', Opt. Express, vol. 17, No. 3, Jan. 22, 2009, pp. 1330-1339.*

* cited by examiner

*Primary Examiner* — Arnel C Lavarias (57) ABSTRACT

A method for reconstructing a holographic projection including providing a single hologram, providing at least one cyclic shift of at least a portion of the single hologram in the space domain, and reconstructing a cyclically shifted hologram by applying said cyclic shift on said portion and providing at least one cyclic shift comprises computing the cyclic shift; wherein computing at least one cyclic shift includes creating an array of shifting points in a g-h plane of the single hologram and calculating a distance vector from an origin of the plane to the shifting point.

16 Claims, 8 Drawing Sheets

FIG. 7

METHOD FOR RECONSTRUCTING A HOLOGRAPHIC PROJECTION

FIELD AND BACKGROUND OF THE INVENTION

The present invention, in some embodiments thereof, relates to computer-generated holography and holographic projections and in particular to a method for reducing speckle-noise in holographic projections.

Computer-generated holography (CGH) is a technique generally used to produce a two- or three-dimensional image, frequently including a use of a Spatial Light Modulator (SLM). CGH finds many practical applications in 3D television, 3D visualization (3D images), pico projectors (for example, handheld projectors), biomedical neural interfaces (for example, for artificially stimulating the nervous system), holographic microscopy, and laser micromachining (for example, for manufacturing applications in microtechnology and nanotechnology). Other applications may include optical traps (for example, as optical tweezers to manipulate single molecules, DNA, proteins, enzymes, and the like), and optical cross connects (for example, for high speed communications switching).

The SLM is a device for forming (reconstructing) an optical image corresponding to an electrical or optical input by modulating an incident light. The incident light, which is typically a coherent light such as that produced by a laser, may be phase modulated, amplitude modulated, phase and amplitude modulated, polarization modulated, or direction modulated, or any combination thereof. An example of one type of SLM may be a digital phase-modulating SLM, which may include a plurality of reflective pixels where each pixel is adapted to vary (modulate) a phase of a light wave reflected from it. In a typical use, the phase-modulating SLM is illuminated with the incident light from the coherent light source and reconstructs the optical image (hereinafter may be referred to as "holographic image" or "image") from an interference pattern created by a diffraction of the modulated light waves reflected by the pixels. A more detailed explanation on the operation of a digital phase-modulating SLM is provided further on herein.

Speckle patterns may appear when reconstructing holographic images, and may contribute to degradation in the quality of the image. Generally referred to as "speckle noise" (when the speckle pattern affects a quality of the image), speckle patterns may be substantially degrading when reconstructing an image using only phase modulation. For convenience hereinafter, "speckle pattern" and "speckle noise" may be used interchangeably. A quantitative measure of the speckle noise may be referred to as "speckle contrast". In phase-only holography (only phase modulation is used), the SLM may only control the phase of the light reflected, for example, from each pixel and not the amplitude of the reflected light. Thus, the reconstructed image is not uniquely determined, and requires special computational procedures. A common solution is to control only the amplitude of a resultant light field in a discrete set of points in the reconstructed image, while leaving the phase of the resultant light field unspecified ("phase freedom"). A result of controlling the amplitude of the light waves at discrete points is that, between the discrete points, the field fluctuates in accordance with the random phases associated with the neighboring specified points, creating the speckle pattern.

Methods are known in the art for attempting to suppress speckle noise, several of which are identified herein, as follows:

U.S. Pat. No. 4,155,630 "SPECKLE ELIMINATION BY RANDOM SPATIAL PHASE MODULATION" relates to "A process and apparatus for improving image creation in a coherent light imagery system which involves directing diffused laser light onto a mirror having a rocking motion that will cause the reflected rays to sweep a two-dimensional area and focusing the reflected light through a diffuser before collimating same for use in image creation. More particularly, this invention creates the rocking motion by applying a combination of voltages to three independent piezo-electric crystals upon which the mirror is mounted."

U.S. Pat. No. 4,256,363 "SPECKLE SUPPRESSION OF HOLOGAPHIC MICROSCOPY" relates to "An apparatus for, and a method of, reconstructing and viewing a speckled holographic image through a microscope, with the result that the speckle of the holographic image is significantly reduced, without loss of resolution of the image. A finely-structured and transparent light diffuser is interposed thru the aerial image formed by a hologram or an image formed or relayed by a lens system such as a microscope objective prior to the eyepiece. This diffuser is moved in its plane with a rotary or vibratory motion to suppress the speckle."

U.S. Pat. No. 6,367,935 "METHOD AND DEVICE FOR ELIMINATING IMAGE SPECKLES IN SCANNING LASER IMAGE PROJECTION" relates to "A method for the elimination of image speckles in a scanning laser projection is suggested, in which a phase hologram is used for dividing the illumination beam of the projector into partial beams. The partial beams are heterodyned again on the image screen within the image element (pixels) to be projected in such a way that differing speckle patterns are formed which average each other out in the eye of the viewer over time and/or space. Thus, a device is provided especially for the laser projection which substantially eliminates or reduces the speckles at the viewer. However, the beam form and the beam density are hardly or not changed."

US Publication No. 2009/0040527A1 "METHO AND APPARATUS FOR SPECKLE NOISE REDCUTION IN ELECTROMAGNECTIC INTERFERENCE DETECTION" relates to "Interference measurements obtained by comparison of a same beam (i.e. same nominal polarization, intensity, coherence length and wavelength) striking a same region on a sample at a same angle, but having a different beam wavefront upon intersection with the region are shown to provide images with independent coherent speckle noise patterns. Accordingly a plurality of interference measurements with diverse beam wavefronts can be used to identify or reduce coherent speckle noise. Reduction of the coherent speckle noise can be performed by compounding the aligned images. A change in the beam wavefront may be provided by displacing the sample in the direction of the beam between or during the measurements, when the beam is a focused beam (i.e. converging or diverging)."

SUMMARY OF THE INVENTION

According to an aspect of some embodiments of the present invention there is provided a method for reconstructing a holographic projection comprising providing a single hologram, providing at least one cyclic shift of at least a portion of the single hologram in the space domain, and reconstructing a cyclically shifted hologram by applying the cyclic shift on the portion. Optionally, providing the at least one cyclic shift comprises computing the cyclic shift. Optionally, computing a cyclic shift includes creating an array of shifting points in a g-h plane of the single hologram and calculating a distance vector from an origin of the plane to the shifting point.

According to some embodiments of the present invention, the at least a portion of the hologram is cyclically shifted over a distance vector corresponding to the shifting point in the g-h plane. Optionally, the method comprises repeatedly cyclically shifting the at least a portion of the single hologram by moving within the array of shifting points from a first shifting point to a second phase shifting point in any order.

Optionally, the method comprises repeatedly cyclically shifting the at least a portion of the single hologram by moving within the array of shifting points from a first shifting point to a second phase shifting point in a raster pattern.

According to some embodiments of the present invention, the array of shifting points is a rectangular lattice of a×b points in the g-h plane. Optionally, a horizontal distance between each two neighboring shifting points in the g-h plane is A/a, and a vertical distance is B/b, where A is a length of the pixel array and B a height of the pixel array. Optionally, the array of shifting points is a square lattice of c×c points in the g-h plane. Additionally or alternatively, a horizontal distance and a vertical distance between each two neighboring shifting points in the g-h plane is C/c where C is a length and a height of the pixel array.

According to some embodiments of the present invention, computing a cyclic shift includes selecting shifting points randomly in a g-h plane of the single hologram and calculating a distance vector from an origin of the plane to the shifting point. Optionally, the at least a portion of the hologram is cyclically shifted over a distance vector corresponding to a different randomly selected shifting point in the g-h plane.

According to some embodiments of the present invention, the method comprises optically modulating a phase of the at least a portion of the single hologram. Optionally, reconstructing a holographic projection comprises reconstructing a plurality of holographic projections.

According to an aspect of some embodiments of the present invention there is provided an apparatus for reconstructing a holographic projection comprising a coherent light source for providing a coherent incident light to a spatial light modulator, a processor for providing a single hologram including a cyclic shift module for providing at least one cyclic shift of at least a portion of the single hologram in the space domain, and the spatial light modulator for reconstructing a cyclically shifted hologram by applying the cyclic shift on the portion. Optionally, providing at least one cyclic shift comprises computing the cyclic. Optionally, the apparatus comprises a detector for detecting the holographic projection.

According to some embodiments of the present invention, computing a cyclic shift includes creating an array of shifting points in a g-h plane of the single hologram and calculating a distance vector from an origin of the plane to the shifting point. Optionally, the at least a portion of the hologram is cyclically shifted over a distance vector corresponding to the shifting point in the g-h plane. Optionally, the apparatus Is adapted to repeatedly cyclically shift the at least a portion of the single hologram by moving within the array of shifting points from a first shifting point to a second phase shifting point in any order.

According to an aspect of some embodiments of the present invention there is provided an method for reducing speckle contrast in at least a portion of a hologram comprising providing the hologram, creating an array of shifting points in a g-h plane of the hologram and calculating a distance vector from an origin of the plane to the shifting point, and reconstructing a cyclically shifted hologram by cyclically shifting at least the portion of the hologram over a distance vector corresponding to the shifting point in the g-h plane. Optionally, the method comprises repeatedly cyclically shifting the at least a portion of the hologram by moving within the array of shifting points from a first shifting point to a second phase shifting point in any order. Optionally, the method comprises repeatedly cyclically shifting the at least a portion of the single hologram by moving within the array of shifting points from a first shifting point to a second phase shifting point in a raster pattern. Additionally or alternatively, the array of shifting points is a rectangular lattice of a×b points in the g-h plane. Optionally, a horizontal distance between each two neighboring shifting points in the g-h plane is A/a, and a vertical distance is B/b, where A is a length of the pixel array and B a height of the pixel array.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to holography and holographic projections and in particular to a method for reducing speckle-noise in holographic projections.

A Spatial Light Modulator (SLM) used for generating holographic projections is generally adapted to modulate an incoming wavefront, which then propagates and diffracts to generate a target pattern (a Fourier transform of a modulation pattern under Fraunhoffer diffraction conditions). Generally, as may be a case for phase-only SLMs, substantially reduced amounts of light are lost during phase-modulation and diffraction which is particularly advantageous in applications requiring sparse and intense target patterns. Furthermore, unlike static diffractive optical elements, holograms displayed on a liquid crystal spatial light modulator (LC-SLM) may be changed rapidly and may generate high-rate dynamic patterns, for example, a 1 kHz display rate for a ferroelectric LC-SLM and greater than 50 Hz, for example, between 75 Hz to 700 Hz, with a nematic LC-SLM.

An inverse Fourier transform of a general target pattern yields a phase-and-amplitude hologram that may not be displayed on a phase-only SLM. Optimization methods known in the art may be used to calculate a phase-only hologram for a given target intensity pattern. For example, the Gerchberg-Saxton (GS) algorithm may be used which is based on allowing the target phases to vary randomly. A drawback with this method is that adjacent band-limited spots in a reconstruction plane overlap and randomly interfere with each other, producing high-frequency speckle noise with 100% contrast.

A known approach to removing the speckle noise includes substantially avoiding abrupt phase changes between adjacent spots by imposing a smoothing constraint on a resulting target phase, which generally removes most of the speckle. This method requires that the target pattern be over-sampled with a drawback that speckles that result from isolated zeros of a phase distribution (optical vortices) may not be resolved. Furthermore, the oversampling may be computationally time expensive. Additionally, to avoid these speckles, an initial phase for the iterative algorithm must be chosen, and even more computationally-demanding algorithms may be required to avoid introducing new vortices during iterations.

A second known approach to the problem is time-averaging by sequentially displaying different random-phase holograms faster than the temporal response of a detector. The different patterns are averaged on an intensity basis reducing speckle contrast. To reduce the speckle contrast by a factor $1/\sqrt{N}$, N different holograms may be required to be calculated, which again may be computationally expensive, and may require long projection times to achieve substantial reduction.

An aspect of some embodiments of the present inventions relates to a method for reconstructing holographic projections by cyclically shifting at least a portion of a single hologram. Cyclically shifting a single hologram alters a reconstructed phase pattern while maintaining a reconstructed amplitude pattern of the projection. The method comprises sequentially generating a plurality of frames from a single hologram wherein each frame is cyclically shifted relative to the preceding frame. Optionally, at least a portion of a frame is cyclically shifted relative to the preceding frame. Additionally or alternatively, the method includes generating a plurality of frames from a single hologram and recalculating the hologram. Optionally, cyclical shifting may be combined with other methods known in the art, including those previously mentioned, for reducing speckle noise.

The method, which may include a deterministic shift averaging approach, provides for speckle contrast to be substantially reduced, optionally eliminated, in the projection using substantially minimum computational power comparatively to methods known in the art. Optionally, the method may include a random shift averaging approach which provides for speckle contrast to be substantially reduced using minimal computational power. Reference is made to a publication "Speckle elimination using shift-averaging in high-rate holographic projection", OPTICS EXPRESS 1330/Vol. 17, No. 3/2 Feb. 2009, authored by Lior Golan and Shy Shoham, the publication incorporated herein by reference in its entirety. Optionally, the method may combine the deterministic shift averaging approach with the random shift averaging approach.

According to some embodiments of the present invention, the deterministic shift-averaging approach includes a combination of horizontal and vertical shifts, for example in a form of a grid which may be a c×c grid, of regularly spaced points in a plane of possible hologram shifts (g-h plane). Optionally, the grid may be an a×b grid of regularly spaced points where a≠b. Optionally, the grid may not be an explicitly defined grid but may be implicitly described by mathematical equations.

An individual cyclical shift of a hologram array, for example a pixel array, may be characterized by two coordinates, an amount of shift in pixels along a lateral axis (g-axis) and an amount of shift in pixels along a longitudinal axis (h-axis). A cyclical shift is may be determined completely by its (g, h) coordinates. The g-h plane is a space that contains all possible shifts. A group of N cyclical shifts may be described by a set of points $(g_i, h_i)$, where i is an index from 1 to N, that reside in the g-h plane. Each cyclical shift may then be computed by calculating a vector distance from an origin of the g-h plane to a point (gi, hi). Shifting may be in any order and/or direction within the g-h plane. Optionally, shifting may be in a form of a raster scan. Additionally or alternatively, the shifting is performed along a vertical line of points on the g-h plane. Optionally, the shifting is performed along a horizontal line of points along the g-h plane. Optionally, all shifting is performed within one integration time of a detector. Optionally, a minimal number of frames (each cyclic shift is represented in one frame of the projection) to be averaged, N, is equal to the number of points on the c×c grid. Additionally or alternatively, N is equal to the number of points on the a×b grid. A speckle contrast using this method may be suppressed by a factor up to $1/\sqrt{N}$. Optionally, the speckle contrast may be suppressed by a factor greater than $1/\sqrt{N}$. Optionally, the speckle contrast may be substantially eliminated.

According to some embodiments of the present invention, the random shift-averaging includes selecting shifting distances to points (gi, hi) within the g-h plane randomly. A speckle contrast using this method may be suppressed by a factor $1/\sqrt{N}$, where N is a total number of cyclically shifted frames reconstructed of the single hologram.

An aspect of some embodiments of the present invention relates to an apparatus for reconstructing holographic projections using cyclical shifting of at least a portion of a single hologram for reducing speckle contrast. The apparatus includes an SLM for phase modulating an incident light beam. Optionally, the modulation includes amplitude modulation. Optionally, the modulation includes phase and amplitude modulation. Additionally or alternatively, the modulation includes polarization modulation, or directional modulation.

According to some embodiments of the present invention, the SLM reconstructs a digital hologram. Optionally, the SLM may be an electrically-addressable SLM (EASLM). Optionally, the SLM may be an optically-addressable SLM (OASLM). Optionally, the SLM may be of a reflective type (reflects the incident light) or of a transmissive type (passes the incident light). Additionally or alternatively, the SLM includes an LC-SLM. Optionally, the LC-SLM may be of a nematic type. Optionally, the LC-SLM may be of a ferroelectric type. Optionally, the SLM may be an MEMS (micro electromechanical system) SLM and may include actuator/piston-mounted micromirror devices, or hinged beam devices. Additionally or alternatively, the SLM may include acousto-optic light modulators or magneto-optic light modulators. Optionally, the SLM may include devices with sub-wavelength modulation. Optionally, the SLM may be a flexoelectric SLM. Optionally, the SLM reconstructs a spatially continuous (analog or non-quantized) hologram, and may include membrane deformable mirror device. Additionally or alternatively, the SLM may comprise a hologram generating module and a separate shift module adapted to cyclically shift the hologram.

According to some embodiments of the present invention, the apparatus includes a coherent light source such as, for example, a laser. Optionally, the coherent light source may include a plurality of coherent light sources with three colors and adapted to alternate sequentially to create a perception of color. Optionally, each color includes a different hologram which may be shift-averaged to reduce speckle noise. Additionally or alternatively, the apparatus may include an Optical Phased-Array which may combine the coherent light source with the SLM.

According to some embodiments of the present invention, the apparatus includes a computational unit for controlling the SLM including a cyclic shift module for providing cyclical shifting of at least a portion of the single hologram. Optionally, providing cyclical shifting may include pre-computed cyclic shifting data preprogrammed into the computational unit/cyclic shifting unit. Optionally, the cyclic shift module is adapted to compute the cyclic shifts. Optionally, the apparatus may include applicable optical elements for directing the light beam. The optical elements may include, for example, beam splitters, beam expanders, de-magnifying lenses, focusing lenses, shaping elements, chromatic or spatial filters, and the like. Optionally, the apparatus may include a detector for capturing an image of the projection and which may include any means suitable for capturing and/or displaying the image, for example, an image recorder (for example a camera), a display device, a display surface, the eye, a biological sample such as a photo-sensitive neural tissue, a photo-refractive material, a photo-sensitive material undergoing a micro-machining process, among others. Optionally, the display device may include a volumetric display device, a stereoscopic display device, an auto-stereoscopic display device, a holographic display device, or any combination thereof.

Figure 1:
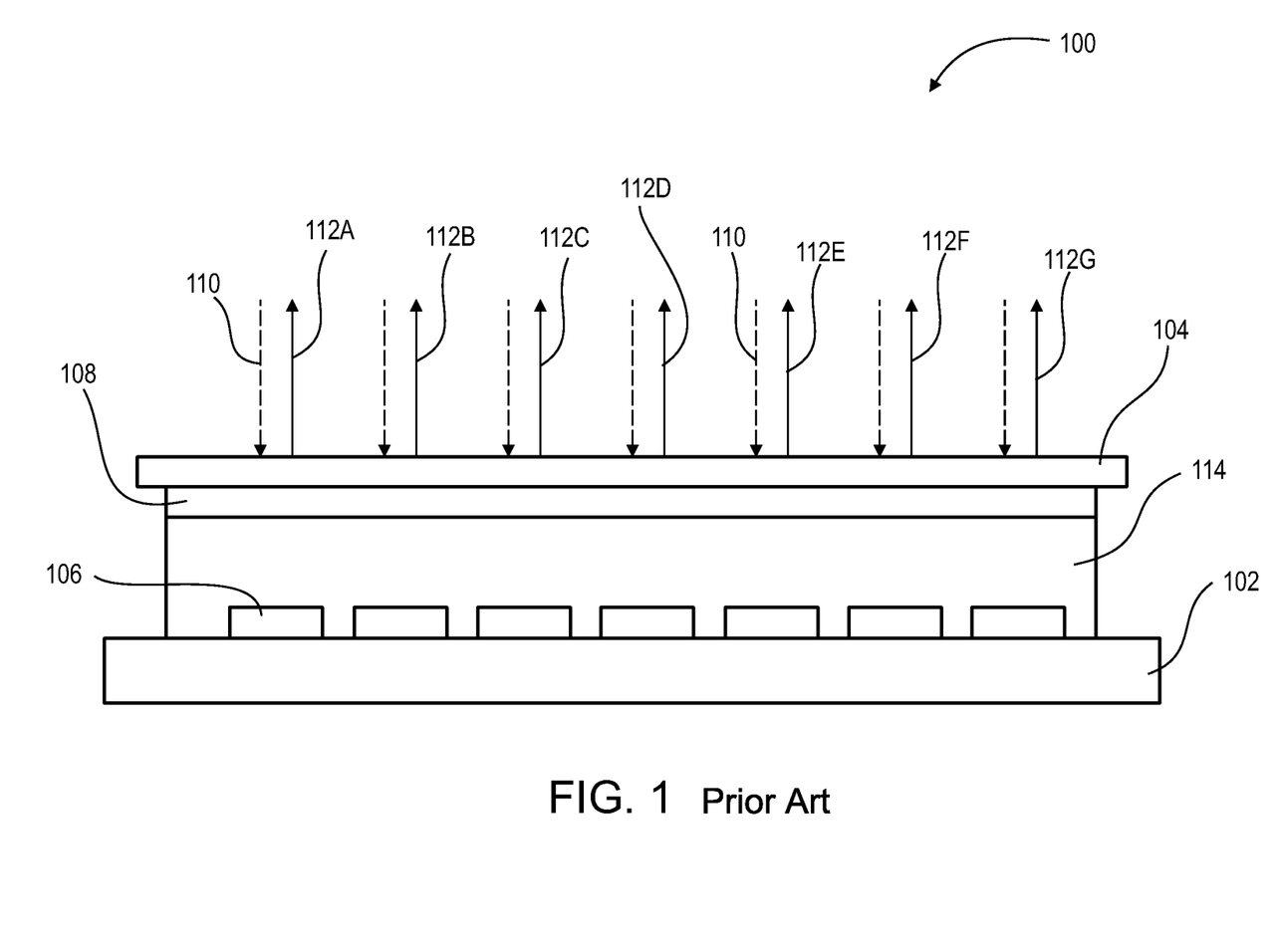
FIG. 1 schematically illustrates a conventional phase modulated LC-SLM as known in the art.

For purposes of better understanding some embodiments of the present invention, as illustrated in FIGS. 2 through 7 of the drawings, reference is first made to the construction and operation of a conventional (i.e., prior art) phase modulated, liquid-crystal spatial light modulator (LC-SLM) 100 as schematically illustrated in FIG. 1. LC-SLM 100 includes a VLSI (very large scale integration) die 102 with an array of reflective pixels 106 (for example, reflective aluminum pixels), each pixel adapted to serve as a reflective mirror and an electrode. Pixels 106 are covered by a nematic liquid crystal layer 114 interposed between the pixel array and a transparent electrode 108 in a "sandwich" configuration. Transparent electrode is covered by a cover glass layer 104.

In a typical mode of operation of LC-SLM 100, polarized light 110 passes through cover glass layer 104, through transparent electrode 108 and through liquid crystal (LC) layer 114 striking pixels 106 from where the light is reflected as a phase-shifted light 112. Each pixel 106 is electrically independently controllable so that a different voltage may be individually applied to each pixel (through VLSI die 102). The voltage applied to each pixel 106 produces an electric field between the pixel and transparent electrode 108, the electric field causing a change in the optical properties of liquid crystal layer 114 so that an extraordinary index of the LC layer is reduced, and a phase shift (delay) in polarized light 110 is induced. By applying different voltages onto each pixel 106, polarized light 110 is optically modulated and phase-shifted according to the reduced index of LC layer 114 in an area through which the light passes, and light waves with different phases are produced, for example, light waves 112A-112G. An amount of phase shift is dependent on the extraordinary index of LC layer 114, a thickness of the layer, and a wavelength of polarized light 110.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
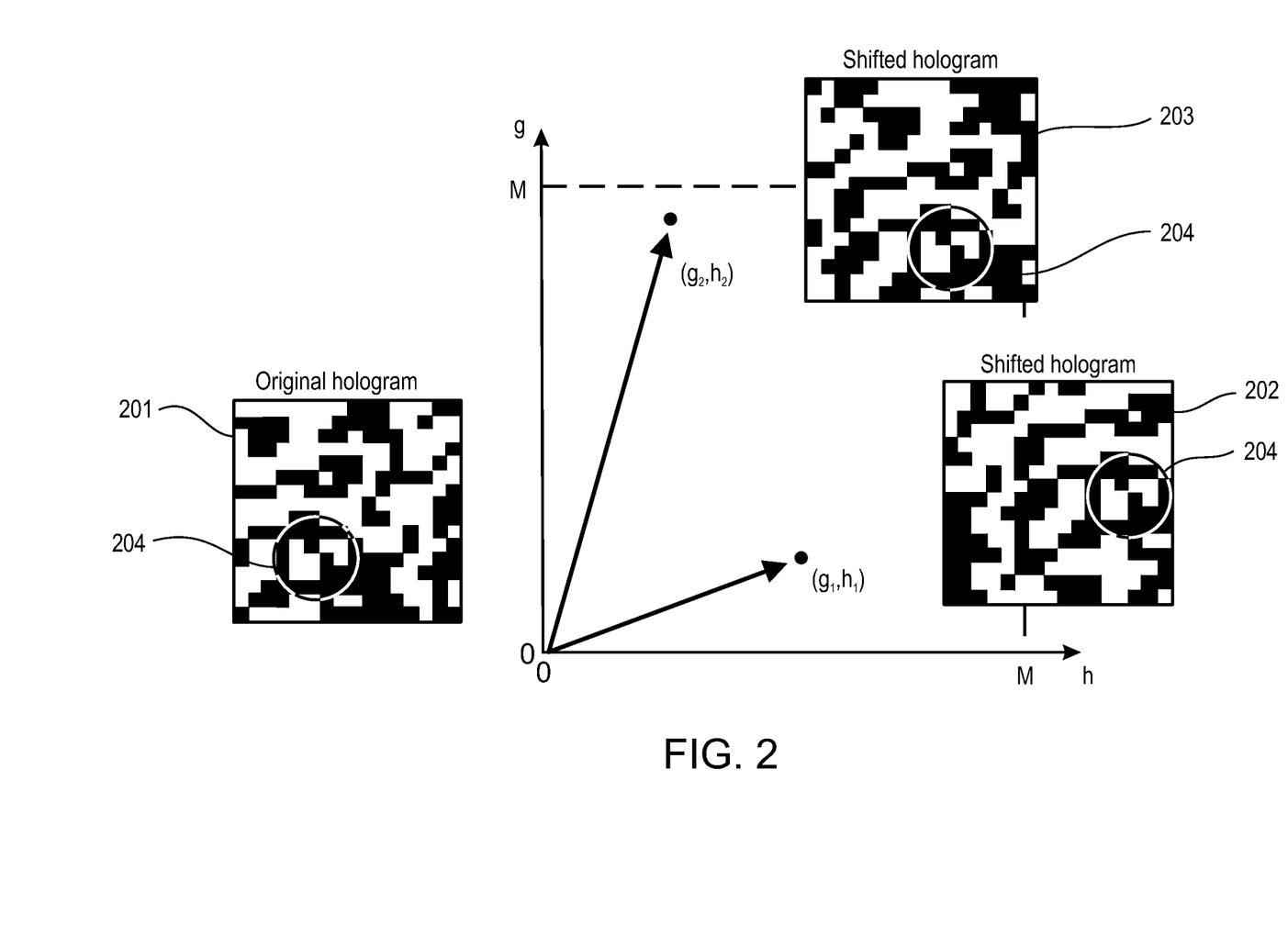
FIG. 2 schematically illustrates an exemplary effect of performing cyclical shifts to an exemplary single (original) hologram as viewed on a g-h plane, according to an embodiment of the present invention.

Reference is now made to FIG. 2 which schematically illustrates an exemplary effect of performing cyclical shifts to an exemplary single (original) hologram 201 as viewed on a g-h plane of the single hologram, according to an embodiment of the present invention. Shown on the g-h plane are a shifted first frame 202 and a second shifted frame 203 following two phase shifts of the single hologram. Circle 204 illustrates a distinctive area in single hologram 201, in first frame 202 and second frame 203, which serves as a reference point for following the cyclical shifting. First frame 202 is shifted over a distance corresponding to a discrete first shift point (g1, h1) on the g-h plane. Second frame 203 is shifted over a distance corresponding to a discrete second shift point (g2, h2) on the g-h plane. Single hologram 201 is of a pixel size M×M. As the shift points are periodic, up to $M^2$ shifts may be performed. Optionally, single hologram 201 may be of a pixel size A×B, where A≠B.

Figure 3A:
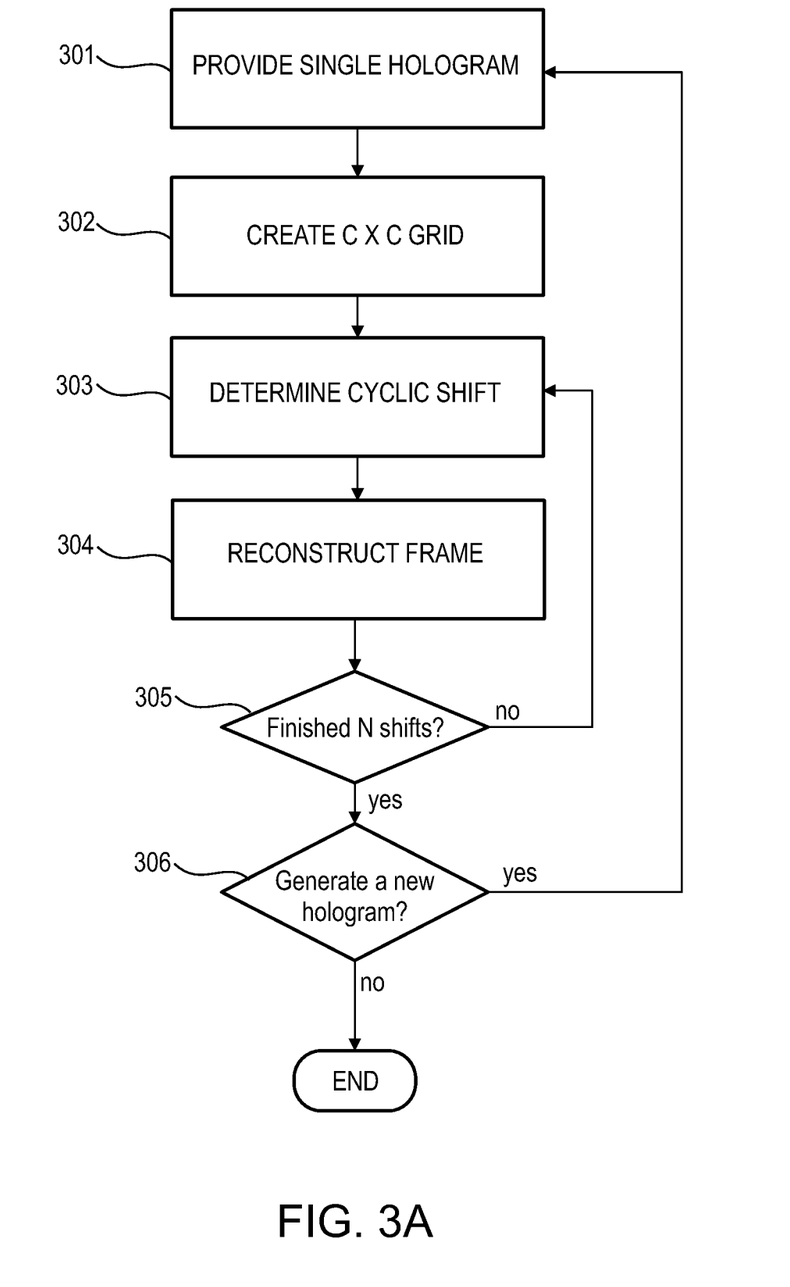
FIG. 3A illustrates a flow chart of an exemplary method for reconstructing a holographic projection by cyclically shifting at least a portion of a single hologram using a deterministic shift-averaging approach, according to some embodiments of the present invention.
Figure 3B:
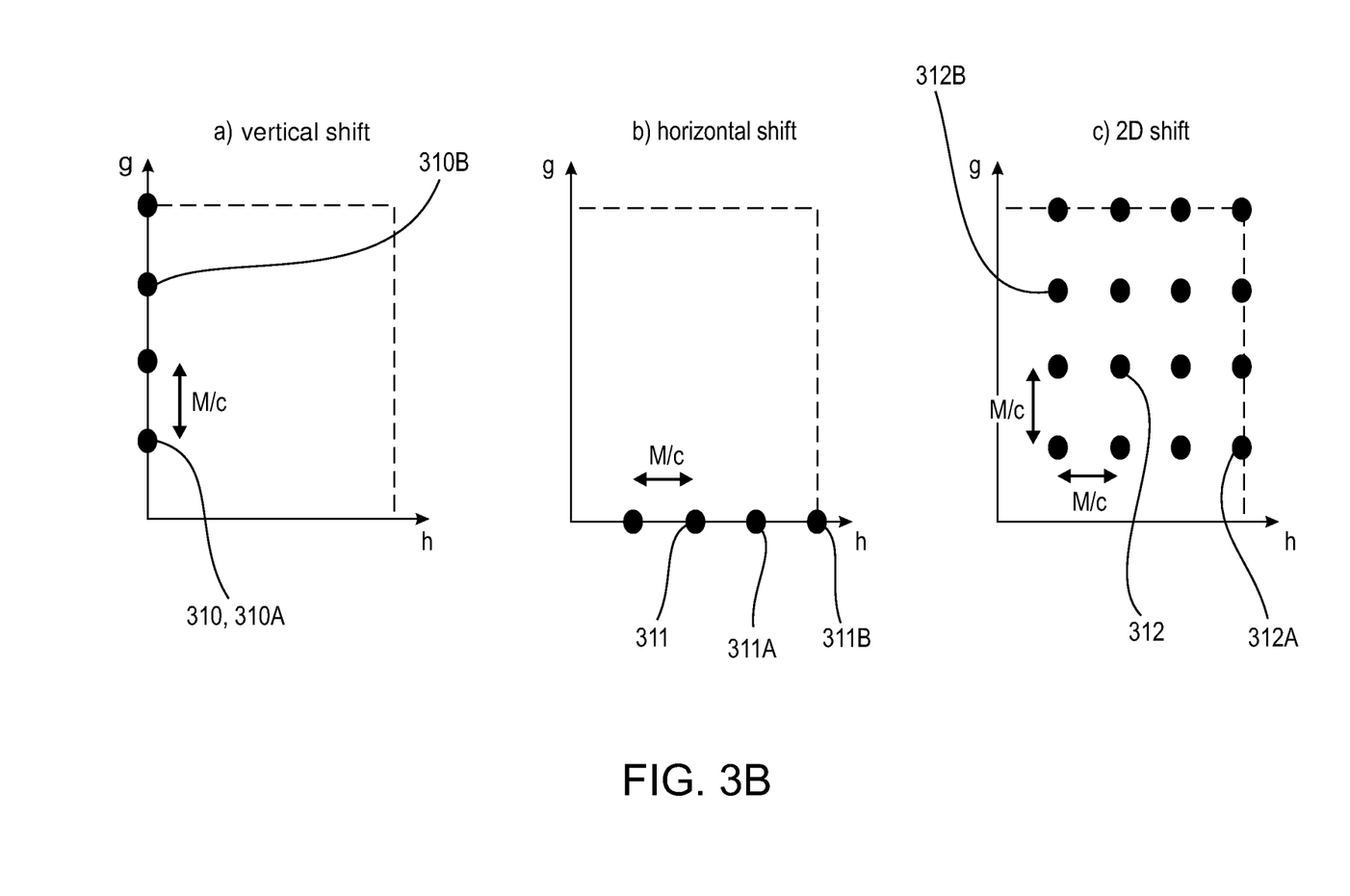
FIG. 3B schematically illustrates an exemplary layout of (a) vertically, (b) horizontally, and (c) two-dimensionally regularly spaced shifting points on the g-h plane of the hologram, respectively, for cyclically shifting the at least a portion of the single hologram, according to some embodiments of the present invention.

Reference is now made to FIG. 3A which illustrates a flow chart of an exemplary method for reconstructing a holographic projection by cyclically shifting a hologram using a deterministic shift-averaging approach, according to some embodiments of the present invention. Optionally, reconstructing the holographic projection comprises reconstructing a plurality of holographic projections. Optionally, the plurality of holographic projections may be used for example, to make movies and/or streaming media (other than movies). Use of the deterministic shift-averaging approach substantially reduces speckle contrast in the projection while using substantially reduced computational power as only a single hologram is constructed. Optionally, speckle contrast is eliminated. Reference is also made to FIG. 3B which schematically illustrates an exemplary layout of (a) vertically, (b) horizontally, and (c) two-dimensionally regularly spaced shifting points on the g-h plane of the hologram, respectively, for cyclically shifting at least a portion of the single hologram a distance vector from an origin of the g-h plane to a different shift point each time, according to some embodiments of the present invention.

The method described herein is for exemplary purposes only and is not intended to be limiting in any way, manner, or form. An ordinary person skilled in the art will appreciate that there are other ways of implementing the method including with respect to which actions are performed and/or an order in which the actions are performed.

Optionally at 301, a single hologram is provided. The hologram may be of a square lattice of pixel size M×M corresponding to a square pixel array in an LC-SLM of that size. Optionally, the pixel array may be a rectangular lattice of size A×B where A is a length of the array and B a height. Optionally, the pixel array may be of any shape, for example, quadrilateral, circular, triangular, or any other polygonal shape.

Optionally at 302, the g-h plane of the single hologram is divided into a grid (matrix) "c" columns wide by "c" rows long of regularly spaced phase shifting points 312, where a distance between each column and each row is M/c; and $c^2$=N where N is a minimum number of frames to be averaged over an integration period of a detector. Refer to FIG. 3B(c) which illustrates the two-dimensional array. Optionally, the grid may be "a" columns wide by "b" columns long, where a≠b, where a distance between each column is A/a and the distance between each row B/b; and a×b=N where N is a minimum number of frames to be averaged over an integration time of the detector. Optionally, only vertical shifting points 310 are used with h=0 and an equal distance separating between the points, for example, M/c. Refer to FIG. 3B(a). Optionally, only horizontal shifting points 311 are used with g=0 and an equal distance separating between the points, for example, M/c. Refer to FIG. 3B(b).

Optionally at 303, cyclic shifting is computed including calculation of the vector distance to each point. Shifting is from a first shift point to a second shift point and may be done in any order and/or direction, for example, from point 312A to point 312B in the c×c grid within the g-h plane (see FIG. 3B(c)). Optionally, shifting in the c×c grid may include a raster pattern. Optionally, shifting may include a non-raster pattern. Optionally, shifting may be done along vertical shift points 310 at h=0 (see FIG. 3B(a)), for example from point 310A to point 310B. Optionally, shifting may be done along horizontal shift points 311 at g=0 (see FIG. 3B(b)), for example from point 311A to point 311B.

Optionally at 304, a frame of the single hologram is reconstructed by the LC-SLM cyclically shifted relative to the preceding frame.

Optionally at 305, if shifting been done to at least all N shift points in the g-h plane continue to 306. Using the two-dimensional shift, speckle contrast is reduced by a factor up to $1/\sqrt{N}$ following the N shifts. Optionally, speckle contrast is reduced by a factor greater than $1/\sqrt{N}$ following the N shifts. Optionally, speckle contrast is eliminated. Using the horizontal or the vertical shift, speckle contrast is reduced by a factor up to $1/\sqrt{N}$ following the N shifts. If no, return to 303.

Optionally at 306, if a new hologram is to be constructed, return to 301. If a new hologram is not to be constructed, go to End.

Figure 4:
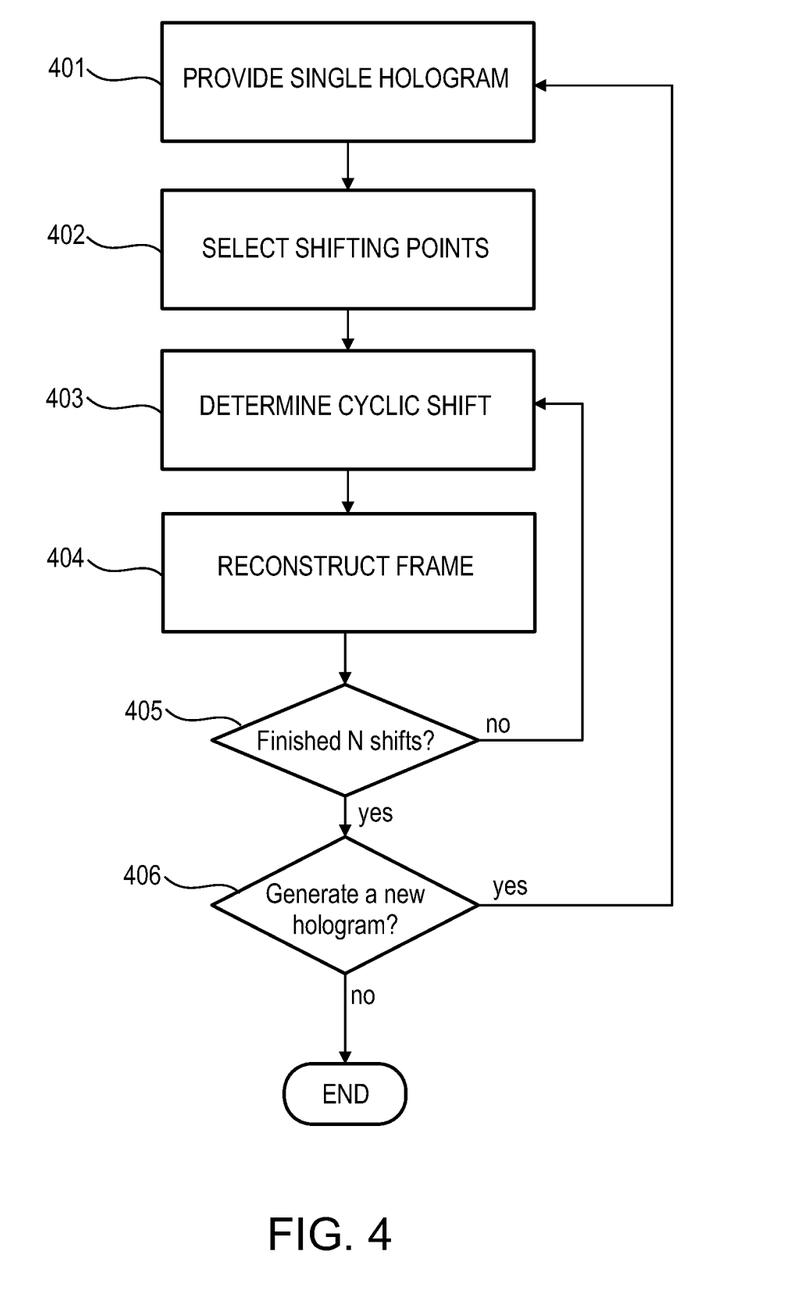
FIG. 4 illustrates a flow chart of an exemplary method for reconstructing a holographic projection by cyclically shifting a hologram using a random shift-averaging approach, according to some embodiments of the present invention.

Reference is now made to FIG. 4 which illustrates a flow chart of an exemplary method for reconstructing a holographic projection by cyclically shifting a hologram, and includes using a random shift-averaging approach, according to some embodiments of the present invention. Use of the random shift-averaging approach may result in a substantial reduction of speckle contrast in the projection while using substantially reduced computational power as only a single hologram is constructed. Optionally, speckle contrast is reduced by a factor up to $1/\sqrt{N}$.

The method described herein is for exemplary purposes only and is not intended to be limiting in any way, manner, or form. An ordinary person skilled in the art will appreciate that there are other ways of implementing the method including with respect to which actions are performed and/or an order in which the actions are performed.

Optionally at 401, a single hologram is provided. The hologram may be of a square lattice of pixel size M×M corresponding to a square pixel array in an LC-SLM of that size. Optionally, the pixel array may be rectangular lattice of size A×B where A is a length of the array and B a height. Optionally, the pixel array me be of any shape, for example, quadrilateral, circular, triangular, or any other polygonal shape.

Optionally at 402, randomly select N shift points in the g-h plane of the single hologram, where N is a minimum number of frames to be averaged over an integration period of a detector and $N \geq M^2$.

Optionally at 403, cyclic shifting is computed including calculation of the vector distance to each point. Shifting is from a first shift point to a second shift point any may be done in any order and/or direction in the g-h plane.

Optionally at 404, a frame of the single hologram is reconstructed by the LC-SLM cyclically shifted relative to the preceding frame.

Optionally at 405, if has shifting been done to at least all N shift points in the g-h plane continue to 406; speckle contrast is reduced by a factor up to $1/\sqrt{N}$ following the N shifts. If no, return to 303.

Optionally at 406, if a new hologram is to be constructed return to 401. If a new hologram is not to be constructed, go to End.

As previously mentioned above, the methods described above and shown by FIGS. 3A, 3B and 4 are non-limiting and are for exemplary purposes only. In either or both methods described a portion of a frame may be cyclically shifted relative to the preceding frame. Optionally, the method may include generating a plurality of frames from a single hologram and recalculating the hologram. Optionally, cyclical shifting may be combined with other methods known in the art, including those previously mentioned, for reducing speckle noise. Optionally, the deterministic shift-averaging approach may be combined with the random shift-average approach.

Figure 5:
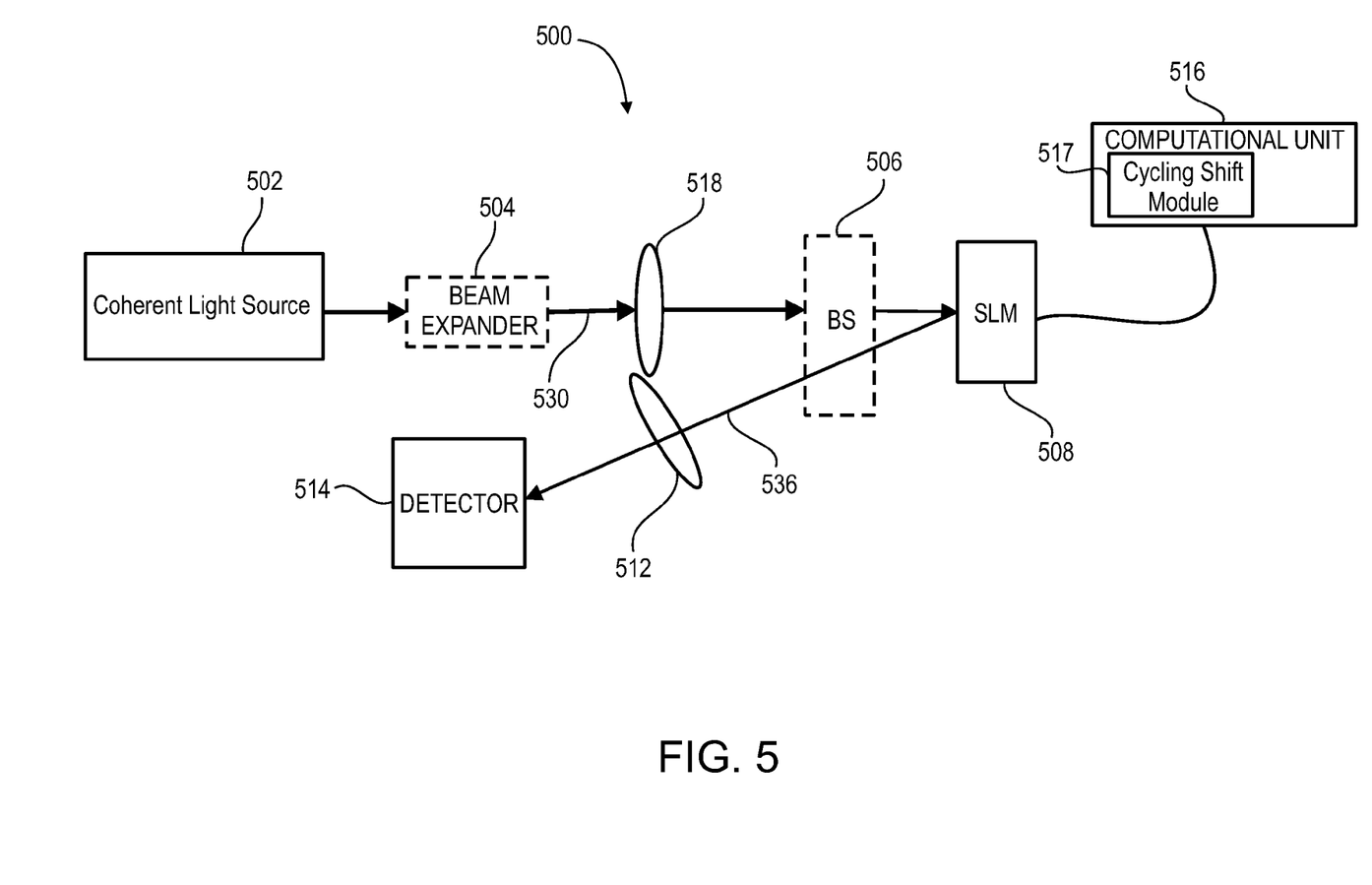
FIG. 5 schematically illustrates an apparatus for reconstructing a holographic projection using cyclical shifting of at least a portion of a single hologram for reducing speckle contrast, according to some embodiments of the present invention.

Reference is now made to FIG. 5 which schematically illustrates an apparatus 500 for reconstructing holographic projections using cyclical shifting of at least a portion of a single hologram for reducing speckle contrast, according to some embodiments of the present invention. Optionally, apparatus 500 may generate a digital holographic projection or a spatially continuous holographic projection. Apparatus 500 is adapted to reconstruct a single hologram and to generate a plurality of frames from the single hologram, wherein each frame generated includes a different phase from that of the preceding frame by cyclically shifting the frame relative to the preceding frame. In one embodiment, apparatus 500 utilizes the deterministic shift-averaging approach to reduce, optionally substantially eliminate, speckle contrast from the hologram, and which may be, for example as shown in FIGS. 3A and 3B. Optionally, speckle contrast may be reduced by a factor up to $1/\sqrt{N}$. Optionally, the speckle contrast may be reduced by a factor greater than $1/\sqrt{N}$, Optionally, apparatus 500 may utilize the random shift-averaging approach to reduce speckle contrast in the hologram by up to $1/\sqrt{N}$, and which may be, for example as shown in FIG. 4.

According to some embodiments of the present invention, apparatus 500 may be adapted to cyclically shift a portion of a frame relative to the preceding frame. Optionally, apparatus 500 may generate a plurality of frames from a single hologram and may additionally recalculate the hologram. Optionally, apparatus 500 may combine cyclical shifting with other methods known in the art, including those previously mentioned, for reducing speckle noise. Optionally, apparatus 500 may combine the deterministic shift-averaging approach with the random shift-average approach.

According to some embodiments of the present invention, Apparatus 500 includes a coherent light source 502, an optional beam expander 504, optional coherent light optical elements 518, an optional beam splitter 506, an SLM 508, a computational unit 516 including a cyclic shift module 517 for providing cyclical shifting of at least a portion of the single hologram, modulated light optical elements 512, and a detector 514. Optionally, cyclic shift module is adapted to compute cyclical shifting of the at least a portion of the single hologram.

Coherent light source 502 which may be, for example a laser, may include a gas laser, a solid-state laser, a semiconductor laser, and the like, is adapted to generate a coherent light beam 530. Optionally, coherent light source 502 may include a plurality of coherent light sources, for example three coherent light sources with three colors, adapted to alternate sequentially to create a perception of color. Optionally, each color includes a different hologram which may be shift-averaged to reduce speckle noise. Optionally, light beam 530 is passed through a beam expander 504 for expanding a diameter of the beam and/or through coherent light optical elements 518 for optically processing the light as may be required (converging, refracting, reflecting, diverging, polarizing, splitting, shaping, filtering, or any combination thereof), an arrangement of a position of the beam expander relative to the coherent light optical elements depending on the application (the light may go through the beam expander and then the optical elements, or through the optical elements and then the beam expander, or any combination thereof, or none of them).

Optional beam splitter (BS) 506 may be a polarized beam splitter (PBS) adapted to split coherent light beam 530 from an optically modulated light 536 produced by SLM 508 for use in applications where the SLM may be adapted to rotate a polarization of the modulated light. Optionally, beam splitter 506 may be a conventional non-polarizing splitter for use in applications where SLM 508 does not alter the polarization of modulated light. Optionally, BS 506 may not be required for use in applications where SLM 508 is of a transmissive type.

According to some embodiments of the present invention, SLM 508 may be, adapted to optically modulate incident coherent light 530 to produce an optically modulated light 536 for reconstructing the single hologram and generating the sequential cyclically shifted frames of the single hologram. Optionally, modulated light 536 includes amplitude modulation. Optionally, modulated light 536 includes phase and amplitude modulation. Additionally or alternatively, modulated light 536 includes polarization modulation, or directional modulation. Optionally, SLM 508 may be an electrically-addressable SLM (EASLM). Optionally, SLM 508 may be an optically-addressable SLM (OASLM). Optionally, SLM 508 may be of a reflective type (reflects the incident light) or of a transmissive type (passes the incident light). Additionally or alternatively, SLM 508 includes an LC-SLM, for example, similar to that shown in FIG. 1 at 100. Optionally, the LC-SLM may be of a nematic type. Optionally, the LC-SLM may be of a ferroelectric type. Optionally, SLM 508 may be an MEMS (micro electromechanical system) SLM and may include actuator/piston-mounted micromirror devices, or hinged beam devices. Additionally or alternatively, SLM 508 may include acousto-optic light modulators or magneto-optic light modulators. Optionally, SLM 508 may include devices with sub-wavelength modulation. Optionally, SLM 508 may be a flexoelectric SLM. Optionally SLM 508 reconstructs a spatially continuous (analog or non-quantized) hologram, and may include membrane deformable mirror device. Additionally or alternatively, SLM 508 may include an Optical Phased-Array which may combine the coherent light source with the SLM.

According to some embodiments of the present invention, SLM 508 may include an M×M pixel array. Optionally, SLM 508 may include a rectangular pixel array (A×B) or any other quadrilateral pixel array, a circular pixel array, a triangular pixel array, or any array comprising any other polygonal shape.

Computational unit 516 is adapted to send a modulation signal to SLM 508 for applying different voltages to the pixels in the pixel array in the SLM for modulating coherent light 530. Computational unit 516 including cyclic shift module 517 may include a PC (personal computer), a laptop (or notebook) computer, a work station, a mainframe computer, a Field Programmable Gate Array (FPGA), a Graphical Processing Unit (GPU), an Application-Specific Integrated Chip (ASIC), or any other programmable device adapted to be programmed with the cyclical shift of the plurality of N frames of the single hologram, and further adapted to individually control each pixel in the pixel array according to the provided, optionally computed, cyclical shifts of the N frames of the at least a portion of the single hologram.

Detector 514 is adapted to detect modulated light 536 (diffracted to form the interference pattern forming the single hologram and subsequently shifted frames) for capturing an image of the speckle-free hologram projection. Optionally, the hologram projection includes a substantially reduced speckle contrast. Detector 514 may include any means suitable for capturing and/or displaying the image, for example a display device such as a 2-D screen or a 3-D screen; a display surface such as, for example a wall or other flat surface; an image recorder such as, for example, a CCD (charge coupled device) camera; the human eye; a biological sample such as a photo-sensitive neural tissue; a photo-refractive material; a photo-sensitive material undergoing a micro-machining process or any combination thereof. Optionally, display device may include a volumetric display device, a stereoscopic display device, an auto-stereoscopic display device, a holographic display device, or any combination thereof. Modulated light 536 may optionally pass through modulated light optical elements 512 adapted to optically process the light as may be required (converging, refracting, reflecting, diverging, polarizing, splitting, shifting, filtering, or any combination thereof) for detection by detector 514.

In an exemplary non-limiting mode of operation, coherent light 530 is transmitted from coherent light source 502 to SLM 508. Coherent light 530 may pass through beam expander 504 for expanding a diameter of the beam and/or through coherent light optical elements 518 for optically processing the light as may be required (converging, refracting, reflecting, diverging, polarizing, splitting, shaping, filtering, or any combination thereof), Coherent light 530 may then pass through optional beam splitter (BS) 506, which may be a polarized beam splitter (PBS), for splitting coherent light beam 530 from an optically modulated light 536 produced by SLM 508. Coherent light 530 impinges on SLM 508 where it is modulated producing optically modulated light 536 used to form a reconstructed single hologram. Modulation of coherent light 530 may be performed by applying different voltages to pixels in the pixel array in the SLM by means of a modulation signal received from Processor 516.

Modulated light 536 is detected by detector 514 for capturing an image of the reconstructed single hologram. Modulated light 536 may optionally pass through modulated light optical elements 512 adapted to optically process the light as may be required (converging, refracting, reflecting, diverging, polarizing, splitting, shifting, filtering, or any combination thereof) for detection by detector 514.

During an integration period of detector 536, computational unit 516 modulates incident coherent light 530 an N number of times according to an N number of cyclic shifts provided, optionally computed, by cyclic shift module 517, and resulting sequential cyclically shifted frames of the single hologram which are captured by detector 514. The modulation by SLM 508 may include phase modulation, amplitude modulation, phase and amplitude modulation, polarization modulation, directional modulation, or any combination thereof. Shifting distance vectors (and the shifting points in the g-h plane) may be preprogrammed in computational unit 516 and/or cyclic shift module 517, and may be according to any of the methods and/or approaches previously described herein.

Cyclically shifting the single hologram N number of times within the integration time of detector 514 results in a holographic projection with reduced speckle contrast. Optionally, speckle contrast may be reduced by a factor up to $1/\sqrt{N}$. Optionally, the speckle contrast may be reduced by a factor greater than $1/\sqrt{N}$, Optionally, the speckle contrast is eliminated in the projection.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Figure 6:
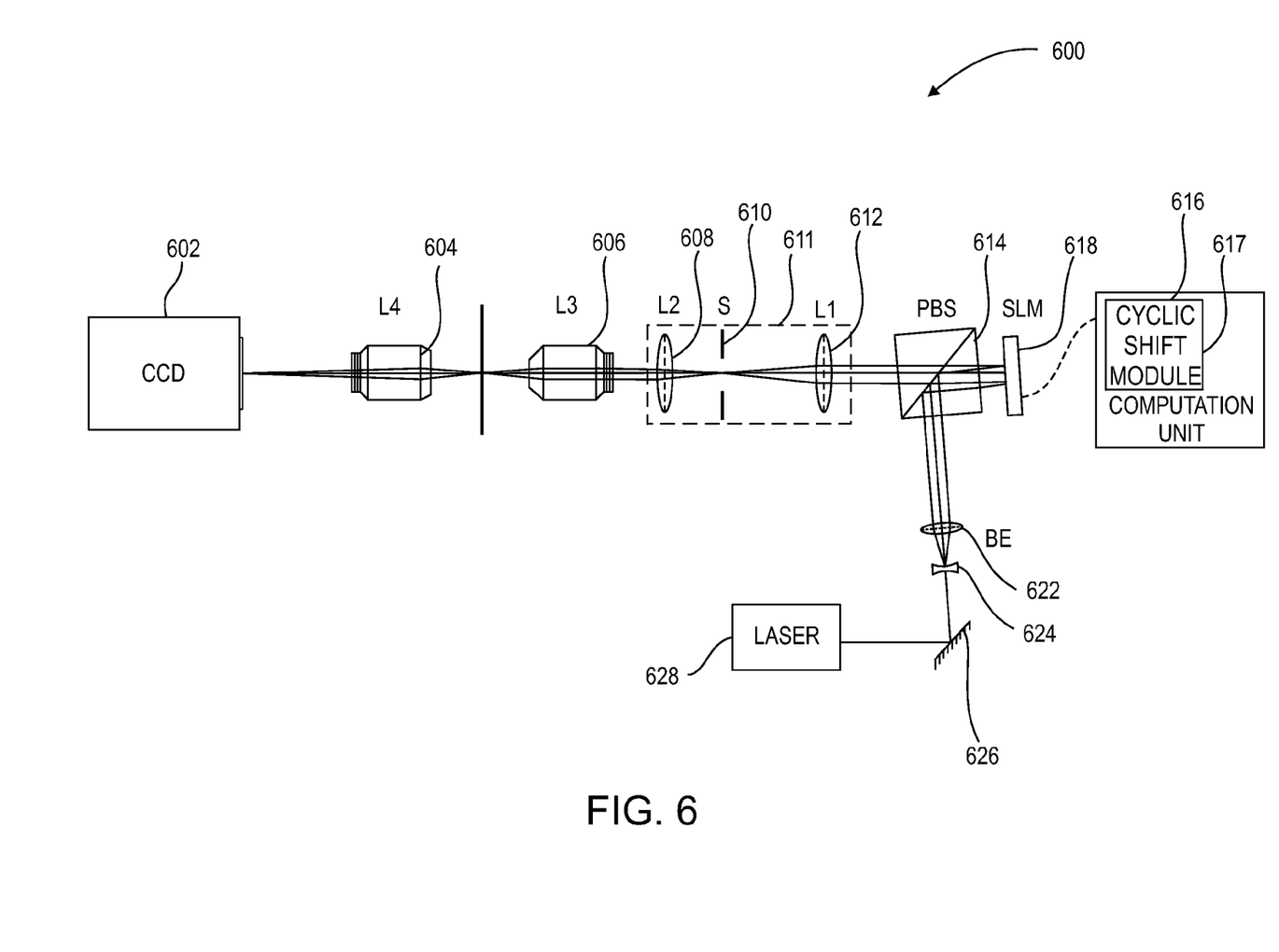
FIG. 6 schematically illustrates an experimental set-up apparatus for implementing the cyclical shifting method, according to some embodiments of the present invention.

Reference is now made to FIG. 6 which schematically illustrates an experimental set-up apparatus 600 for implementing the cyclical shifting method described above, and to FIG. 7 which photographically illustrates a comparison of images produced with apparatus 600 using a time-averaging method as known in the art, and the random phase-shifting approach and deterministic phase-shifting approach described above. The following experimental setup and the comparative results, together with the above descriptions, illustrate some embodiments of the invention in a non limiting fashion.

A 532 nm laser beam produced by a laser 628 is reflected by a mirror 626, passed through a diverging lens 624 and through a beam expander 622, to a polarized beam splitter 614 from which a polarized beam illuminates a binary ferroelectric LC-SLM 618 (model SXGA-R3 of Forthdd Inc). The modulated wave is imaged by a de-magnifying telescope 611 onto the entrance pupil of a 10× microscope objective L3 606. De-magnifying telescope 611 includes a first lens L1 612 and a second lens L2 608, and a rectangular slit 610 placed at the intermediate reconstruction plane to block the zero and negative orders. The reconstruction field is imaged using a second objective L4 604 (20×) to the surface of a CCD camera 602.

A target pattern used was 512×512 pixels, and contained several contiguous patches with varying diameters. The pattern was random enough to get good results without the need for a complex algorithm. A GSW algorithm suggested by DiLeonardo et al. ("Computer generation of optimal holograms for optical trap arrays," Optics Express 15, 1913-1922 (2007) incorporated herein by reference in its entirety) which is a uniformity-optimized version of the GS algorithm was used, although other algorithms known in the art may have been used. The continuous results of the GSW were binarized for display on the ferroelectric LC-SLM. Very good results were obtained after 8 iterations. Total runtime of the GSW was 570 msec per hologram on an Intel Core2 Q9300 2.5 GHz personal computer.

Figure 7:
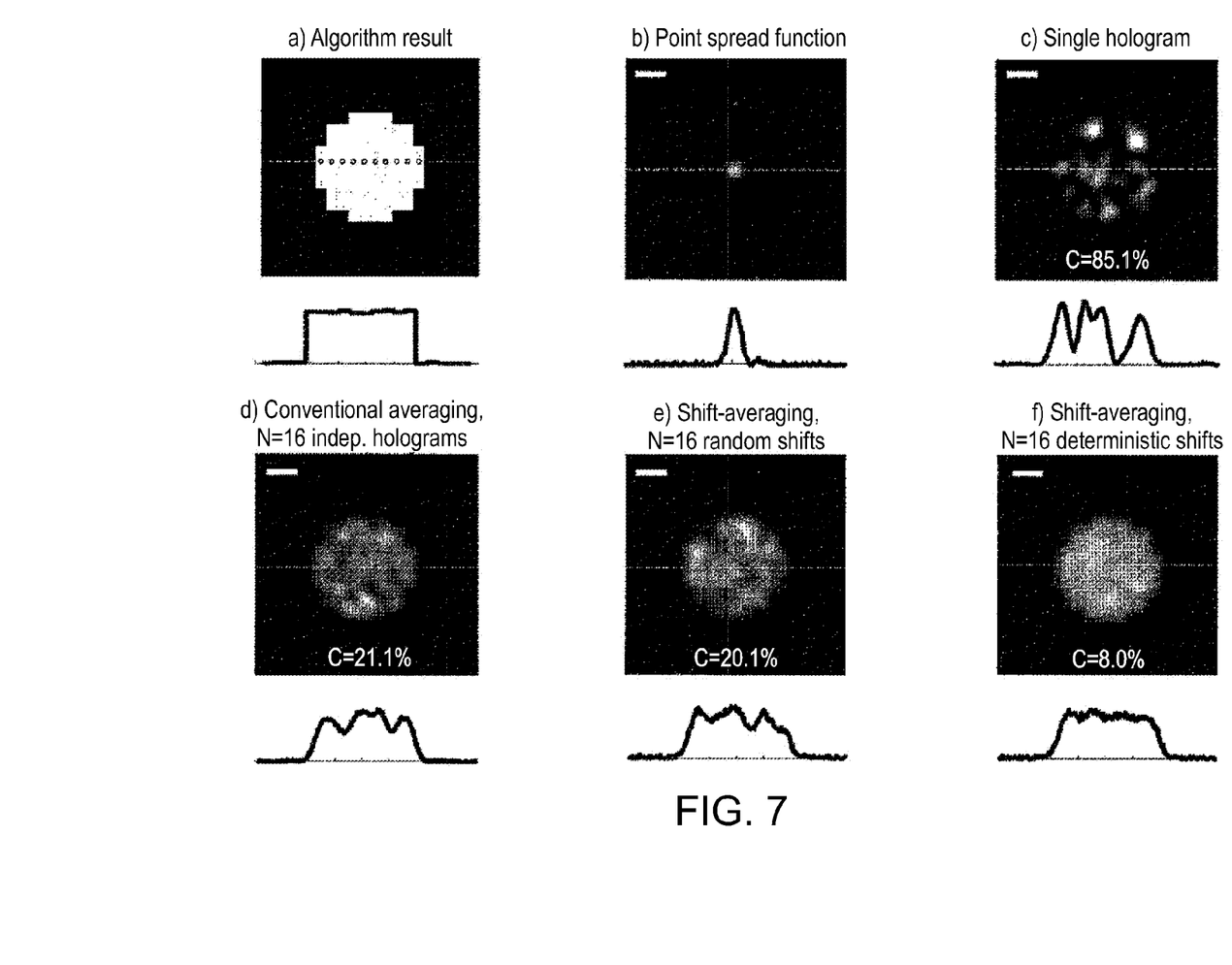
FIG. 7 photographically illustrates a comparison of images produced with the set-up apparatus using a time-averaging method as known in the art, and the random phase-shifting approach and deterministic phase-shifting approach described according to some embodiments of the present invention.

The different methods for speckle reduction were compared. Averaging of N=16 frames was chosen as a best compromise between response time and performance. This gave apparatus 600 a total frame time of 7.8 msec. For each method, the speckle contrast $C=\sigma_I/\bar{I}$ (J. W. Goodman, Introduction to Fourier Optics, $3^{rd}$ edition, Robert and Company, 2005, incorporated herein by reference in it entirety) was estimated based on a measured intensity in a central portion of a reconstructed patch (a circle with a diameter of 25 µm, 10 pixel diameter). The results of the comparison are shown in FIG. 7. Scale bars are 10 µm. At 7a is shown a result of the 8-iteration GSW yielding high uniformity; at 7b is shown apparatus PSF; at 7c is shown a single hologram with severe speckling due to no averaging; at 7d is shown the effect of time averaging as known in the art with speckle contrast reduced, produced by sequentially displaying 16 independently-calculated holograms; at 7e is shown the effect of using the random shift-averaging approach with 16 random shifts of a single hologram resulting in reduced speckle contrast; at 7f is shown the effect of using the deterministic shift-averaging approach with 16 shifts (c=4) of a single hologram, resulting in speckle substantially illuminated and a relatively smooth, uniformly-illuminated spot.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for reconstructing a holographic projection comprising:
   providing a single hologram;
   providing at least one cyclic shift of at least a portion of the single hologram in a space domain;
   reconstructing a cyclically shifted hologram by applying said at least one cyclic shift on said portion; and
   providing at least one cyclic shift comprises computing the cyclic shift; wherein
   computing at least one cyclic shift includes creating an array of shifting points in a g-h plane of the single hologram and calculating a distance vector from an origin of the plane to a shifting point.

2. The method according to claim 1 wherein the at least a portion of the hologram is cyclically shifted over a distance vector corresponding to the shifting point in the g-h plane.

3. The method according to claim 2 comprising repeatedly cyclically shifting the at least a portion of the single hologram by moving within the array of shifting points from a first shifting point to a second phase shifting point in any order.

4. The method according to claim 2 comprising repeatedly cyclically shifting the at least a portion of the single hologram by moving within the array of shifting points from a first shifting point to a second phase shifting point in a raster pattern.

5. The method according to claim 4 wherein a horizontal distance between each two neighboring shifting points in the g-h plane is A/a, and a vertical distance is B/b, where A is a length of a pixel array and B a height of the pixel array.

6. The method according to claim 1 wherein the array of shifting points is a rectangular lattice of a×b points in the g-h plane, where "a" and "b" are each a number of points in a polygonal lattice of points where "a" does not equal "b".

7. The method according to claim 6 wherein a horizontal distance between each two neighboring shifting points in the g-h plane is A/a, and a vertical distance is B/b, where A is a length of a pixel array and B a height of the pixel array.

8. The method according to claim 1 wherein the array of shifting points is a square lattice of c×c points in the g-h plane, where "c" is a number of points in a square lattice of points.

9. The method according to claim 8 wherein a horizontal distance and a vertical distance between each two neighboring shifting points in the g-h plane is C/c where C is a length and a height of a pixel array.

10. An apparatus for reconstructing a holographic projection comprising:
    a coherent light source adapted to provide a coherent incident light to a spatial light modulator;
    a processor adapted to provide a single hologram, including a cyclic shift module adapted to provide at least one cyclic shift of at least a portion of said single hologram in a space domain;
    a spatial light modulator adapted to reconstruct a cyclically shifted hologram by applying said at least one cyclic shift on said at least a portion; wherein,
    said cyclic shift module is further adapted:
       to compute at least one cyclic shift of said at least a portion of said single hologram; and
       to create an array of shifting points in a g-h plane of said single hologram and calculate a distance vector from an origin of the plane to a shifting point in order to compute said at least one cyclic shift of said at least a portion of said single hologram.

11. The apparatus according to claim 10 wherein the at least a portion of the single hologram is cyclically shifted over a distance vector corresponding to the shifting point in the g-h plane.

12. The apparatus according to claim 11 adapted to repeatedly cyclically shift the at least a portion of the single hologram by moving within the array of shifting points from a first shifting point to a second phase shifting point in any order.

13. A method for reducing speckle contrast in at least a portion of a hologram comprising:
    providing said hologram;
    creating an array of shifting points in a g-h plane of said hologram and calculating a distance vector from an origin of the plane to a shifting point; and
    reconstructing a cyclically shifted hologram by cyclically shifting at least said portion of said hologram over a distance vector corresponding to the shifting point in the g-h plane.

14. The method according to claim 13 comprising repeatedly cyclically shifting the at least a portion of said hologram by moving within the array of shifting points from a first shifting point to a second phase shifting point in any order.

15. The method according to claim 14 comprising repeatedly cyclically shifting the at least a portion of the single hologram by moving within the array of shifting points from a first shifting point to a second phase shifting point in a raster pattern.

16. The method according to claim 15 wherein the array of shifting points is a rectangular lattice of a×b points in the g-h plane, where "a" and "b" are each a number of points in a polygonal lattice of points where "a" does not equal "b".

* * * * *